United States Patent
Jia et al.

(10) Patent No.: US 8,582,539 B2
(45) Date of Patent: Nov. 12, 2013

(54) SYSTEM AND METHOD TO IMPLEMENT SYNCHRONOUS CHANNEL TIMING IN A WIRELESS COMMUNICATIONS NETWORK

(75) Inventors: Zhanfeng Jia, Belmont, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 834 days.

(21) Appl. No.: 12/277,072

(22) Filed: Nov. 24, 2008

(65) Prior Publication Data
US 2010/0128700 A1 May 27, 2010

(51) Int. Cl.
*H04J 3/00* (2006.01)
(52) U.S. Cl.
USPC .......................................... 370/336; 370/345
(58) Field of Classification Search
USPC ................. 370/231, 235, 236, 326, 336, 345, 370/395.4, 442, 503
See application file for complete search history.

(56) References Cited

U.S. PATENT DOCUMENTS

| | | | | |
|---|---|---|---|---|
| 6,335,933 B1 * | 1/2002 | Mallory | ........................ | 370/394 |
| 6,487,689 B1 * | 11/2002 | Chuah | ........................... | 714/748 |
| 7,327,735 B2 * | 2/2008 | Robotham et al. | ............ | 370/394 |
| 7,801,146 B2 * | 9/2010 | Aramaki et al. | ............. | 370/394 |
| 2002/0069388 A1 * | 6/2002 | Niu et al. | ...................... | 714/748 |
| 2002/0101839 A1 | 8/2002 | Farley et al. | | |
| 2004/0097194 A1 * | 5/2004 | Karr et al. | ..................... | 455/41.2 |
| 2004/0179501 A1 * | 9/2004 | Marsan et al. | ................ | 370/336 |
| 2006/0128402 A1 | 6/2006 | Lee et al. | | |
| 2007/0097984 A1 * | 5/2007 | Jang et al. | ................ | 370/395.21 |
| 2007/0275746 A1 | 11/2007 | Bitran | | |
| 2008/0045255 A1 | 2/2008 | Revel et al. | | |
| 2009/0041000 A1 * | 2/2009 | Obuchi et al. | ................. | 370/345 |
| 2010/0172287 A1 * | 7/2010 | Krieter | .......................... | 370/328 |

FOREIGN PATENT DOCUMENTS

| | | |
|---|---|---|
| CN | 101132262 A | 2/2008 |
| CN | 101179361 A | 5/2008 |
| JP | 2008512034 A | 4/2008 |
| JP | 2010515332 A | 5/2010 |
| JP | 2010515385 A | 5/2010 |
| JP | 2010522448 A | 7/2010 |
| WO | 2006025658 A1 | 3/2006 |
| WO | 2008078311 A2 | 7/2008 |
| WO | 2008085000 A1 | 7/2008 |
| WO | 2008109453 A1 | 9/2008 |

OTHER PUBLICATIONS

International Search Report & Written Opinion—PCT/US2009/065384—International Search Authroity—European Patent Office—May 20, 2010.
Taiwan Search Report—TW098139938—TIPO—Sep. 14, 2012.

* cited by examiner

*Primary Examiner* — Warner Wong
(74) *Attorney, Agent, or Firm* — Paul S. Holdaway (57) ABSTRACT

A system and method to implement synchronous channel timing are disclosed. The method comprises establishing a session time interval. In addition, the method comprises establishing a first time interval within the session time interval for transmitting a first data packet.

72 Claims, 9 Drawing Sheets

SCHEDULING ONE OR MORE RETRANSMISSION TIME INTERVAL WITHIN THE FIRST TIME INTERVAL 502

RETRANSMITTING THE FIRST DATA PACKET WITHIN THE SCHEDULED RETRANSMISSION TIME INTERVAL 504

RECEIVING A FIRST ACKNOWLEDGEMENT MESSAGE FOR THE FIRST DATA PACKET WITHIN THE SCHEDULED RETRANSMISSION TIME INTERVAL 506

SYSTEM AND METHOD TO IMPLEMENT SYNCHRONOUS CHANNEL TIMING IN A WIRELESS COMMUNICATIONS NETWORK

FIELD

This application relates generally to communications, and more specifically, to media access control in a wireless communications network.

BACKGROUND

Wireless devices in a wireless communication system may communicate with one another via signals having frequencies within a given radio frequency band. The traditional method of providing synchronous channel timing is to define periodic transmissions. For example, devices are synchronized to align with a slotted or super frame structure. When a data channel is set up, a subset of periodic slots are assigned to the channel. Data transmissions then happen in the assigned slots.

Techniques such as these may be employed in a variety of wireless communication systems in personal area network ("PAN") or body area network ("BAN") applications. An access scheme for some wireless PAN or BAN applications may need to support a variety of devices with significantly different requirements. For example, for some devices it is important to consume as little power as possible. In addition, a given device in a network or different devices in a network may support a wide range of data rates. Consequently, the access scheme may need to provide relatively robust, yet flexible, functionality.

BRIEF SUMMARY

A system and method to implement synchronous channel timing are disclosed. The method comprises establishing a session time interval. In addition, the method comprises establishing a first time interval within the session time interval for transmitting a first data packet.

DETAILED DESCRIPTION

Various aspects of the invention are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect comprises at least one element of a claim.

In some aspects a media access control scheme enables two or more devices to communicate over a common communication medium. For example, a spectrum of a wireless PAN or BAN may be divided into channels in time-space. These channels may be defined, for example, to accommodate different types of data, different data rates, different qualities of service, or some other criteria. In such a channelization scheme, various techniques may be employed to set up the channels and make use of the channels.

Figure 1:
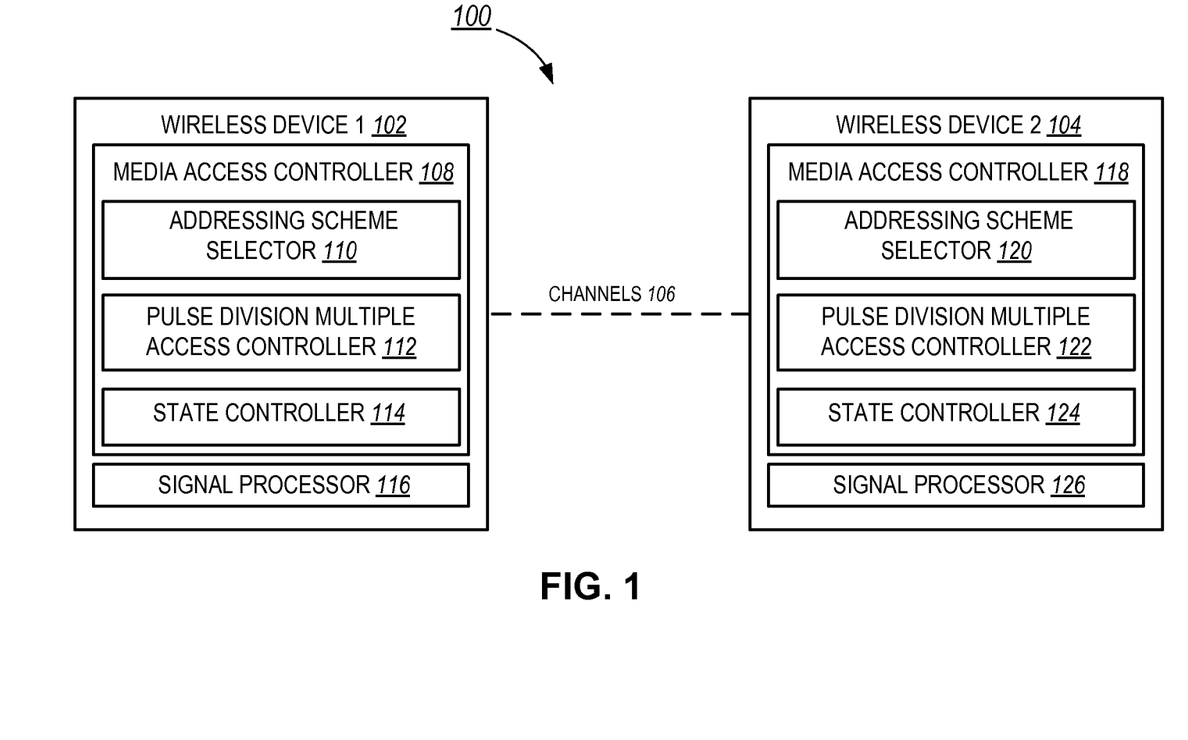
FIG. 1 is a simplified block diagram of exemplary aspects of a communication system to implement synchronous channel timing according to one aspect of the invention.

FIG. 1 is a simplified block diagram 100 of exemplary aspects of a communication system to implement synchronous channel timing according to one aspect of the invention. As shown in FIG. 1, communication system 100 includes communication devices 102 and 104 adapted to establish one or more communication channels 106 with one another. To reduce the complexity of FIG. 1, only a pair of devices is shown. In practice, the system 100 may include several devices that share the communication medium by establishing one or more other channels (not shown in FIG. 1).

In some implementations, the devices 102 and 104 may comprise a wireless station such as a cell phone, a personal data assistant, or a personal entertainment device (e.g., a music or video player). Furthermore, in certain implementations, the devices 102 and 104 may be a headset including one or more input device (such as a microphone) and one or more output device (such as a speaker). In addition, the devices 102 and 104 may comprise a medical device including one or more input devices (such as a sensor including a heartbeat sensor). The devices 102 and 104 may also comprise a watch with a user interface display with indications such as sound, light (LED), and vibration. It should be appreciated that in other implementations, the devices 102 and 104 may comprise other types of devices.

The devices 102 and 104 include media access controllers 108 and 118, respectively, for providing access to the communication medium. In one aspect, the media access control architecture involves defining and implementing a network topology scheme, an addressing scheme, a channelization scheme (e.g., a channel access scheme), and a media access control state and control scheme. To provide such functionality, the media access controllers 108 and 118 may include an addressing scheme selector 110 and 120, respectively, a pulse division multiple access controller 112 and 122, respectively, and a state controller 114 and 124, respectively, as well as other components (not shown in FIG. 1).

Furthermore, an addressing scheme selector 110 may be used to define an addressing scheme for a given channel. Here, unique addressing may be provided for messages associated with a given channel while reducing power and bandwidth requirements. For example, in one aspect, messaging for a given channel may employ a source address that is shorter than the network device address of a corresponding transmitter. In addition, messaging for a given channel may employ a destination address that is shorter than the network device address of a corresponding receiver. In an alternative aspect, messaging for a given channel may not employ a source address, a destination address, or source and destination addresses. In this case, a unique signaling scheme may be defined for the channel such that a receiver may identify data destined for that receiver by simply analyzing the unique signaling scheme associated with received data.

In one aspect, a state controller 114 may be used to define and maintain various media access control states. For example, the media access control may employ one or more relatively low power states when data is not being transmitted and may employ higher power states when data is being transferred. In some aspects, these different states may be associated with different levels of duty cycle, different knowledge of channel parameters, and different levels of channel synchronization.

The devices 102 and 104 also include signal processors 116 and 126, respectively, for processing signals associated with the channel(s) 106. For example, the signal processors 116 and 126 may process and/or generate signals to be transmitted over a channel. In addition, the signal processors 116 and 126 may process signals received over a channel.

In one aspect, a pulse division multiple access (PDMA) controller 112 may be used to define and implement a pulse division multiple access channelization scheme. Through the use of pulse division multiple access, the media access control may define several channels that concurrently coexist with little or no interference between the channels. Consequently, the media access control may independently define a channel, without coordinating with a coordinator or a central controller. For example, the devices 102 and 104 may independently establish several channels 106 and concurrently send data over the channels 106. In addition, other neighboring peer devices (not shown) may independently establish other channels that are operated concurrently with the channel(s) 106.

Moreover, through the use of pulse division multiple access the media access control may efficiently support different types of applications with different types of data and different data rates. For example, one channel may support asynchronous (e.g., bursty) data while another channel supports streaming data such as audio and/or video that is received at regular intervals. Advantageously, these channels may operate concurrently, with each channel having little or no effect on the operation of the other channel.

Figure 2:
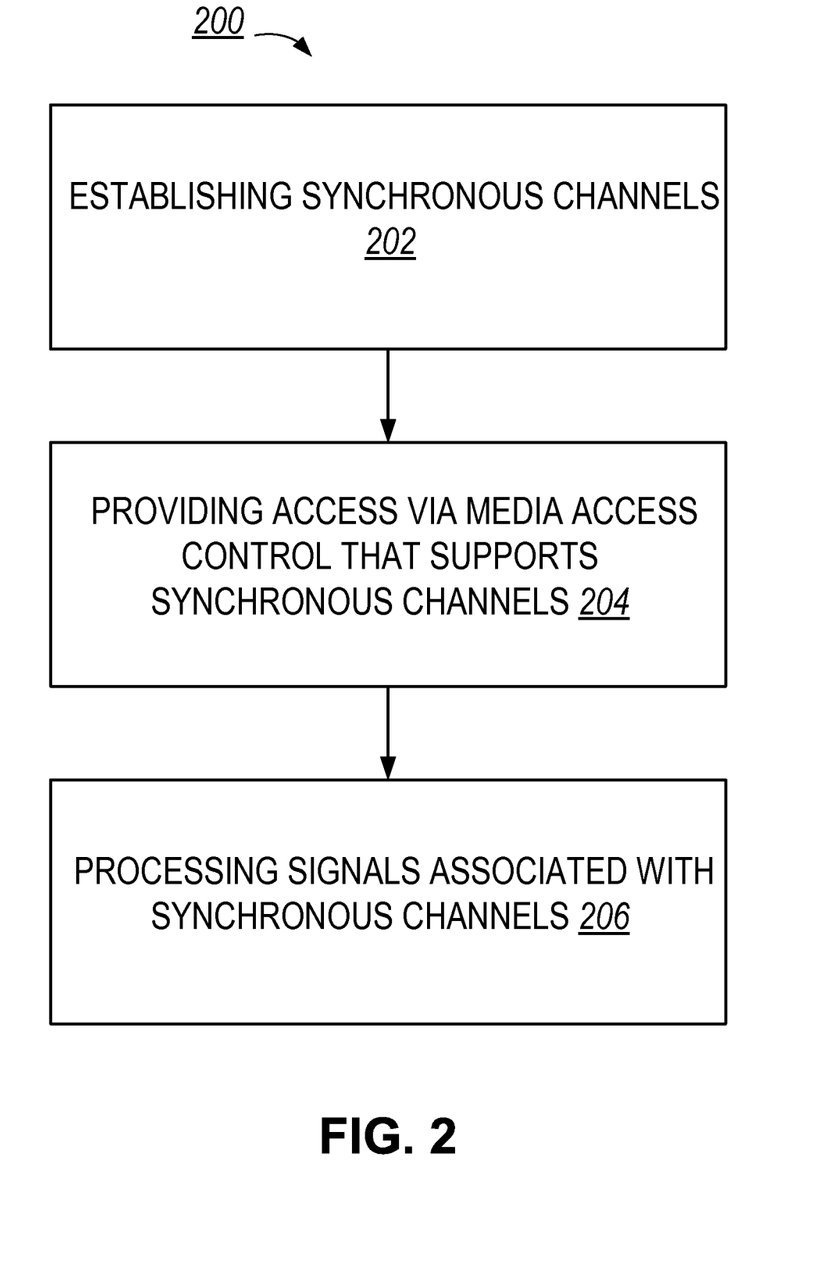
FIG. 2 is a flowchart showing exemplary aspects of operations that may be performed to implement synchronous channel timing according to one aspect of the invention.

FIG. 2 is a flowchart 200 showing exemplary aspects of operations that may be performed to implement synchronous channel timing according to one aspect of the invention. For convenience, the operations of FIG. 2 (or any other flowchart herein) may be described as being performed by specific components. In practice, these operations may be performed in conjunction with and/or by other components.

In block 202, one or more of the devices may establish (e.g., define) one or more synchronous channels. For example, in some aspects a device (e.g., device 102) may independently define a synchronous channel. Alternatively, a device may cooperate with a peer device (e.g., device 104) to define a synchronous channel.

In block 204, a device may thus provide access via media access control that supports synchronous channel timing. As discussed above, in one aspect, a media access controller may operate independently to provide access. Alternatively, one or more of the devices in the system 100 (shown in FIG. 1) may function as a central controller or provide similar functionality to coordinate access to the communication medium. In some scenarios, one device may naturally play a central role in a wireless personal area network. For example, a user's handset may be a coordinator or a master of a number of peripheral devices such as a headset, a cell phone, and a media player. In one aspect, the coordinator or master functionality may be implemented in higher layer protocols or profiles.

As shown in block 206, a signal processor may process signals associated with one or more of the channels. For example, a signal processor may process signals to be transmitted over a channel and/or process signals received from a channel in accordance with the signaling scheme as discussed above. Thus, a signal processor may generate data pulses to be transmitted over the channel and/or extract data from pulses received via the channel. In this way, data may be sent between peer devices via the channel(s).

Improved media access control performance also may be achieved through the use of a pulse division multiple access scheme. For example, given that multiple channels may be operated concurrently and independently, the media access control may maintain a given level of quality of service for one type of channel irrespective of any data transmissions associated with any other channel in the system. The media access control may not need to perform multiplexing operations as may otherwise be required in a media access control scheme that only allows one device to communicate over a communication medium at a given time. Moreover, the media access control may not need to perform associated reliability operations such as retransmissions, acknowledgments, and error checking.

Figure 3:
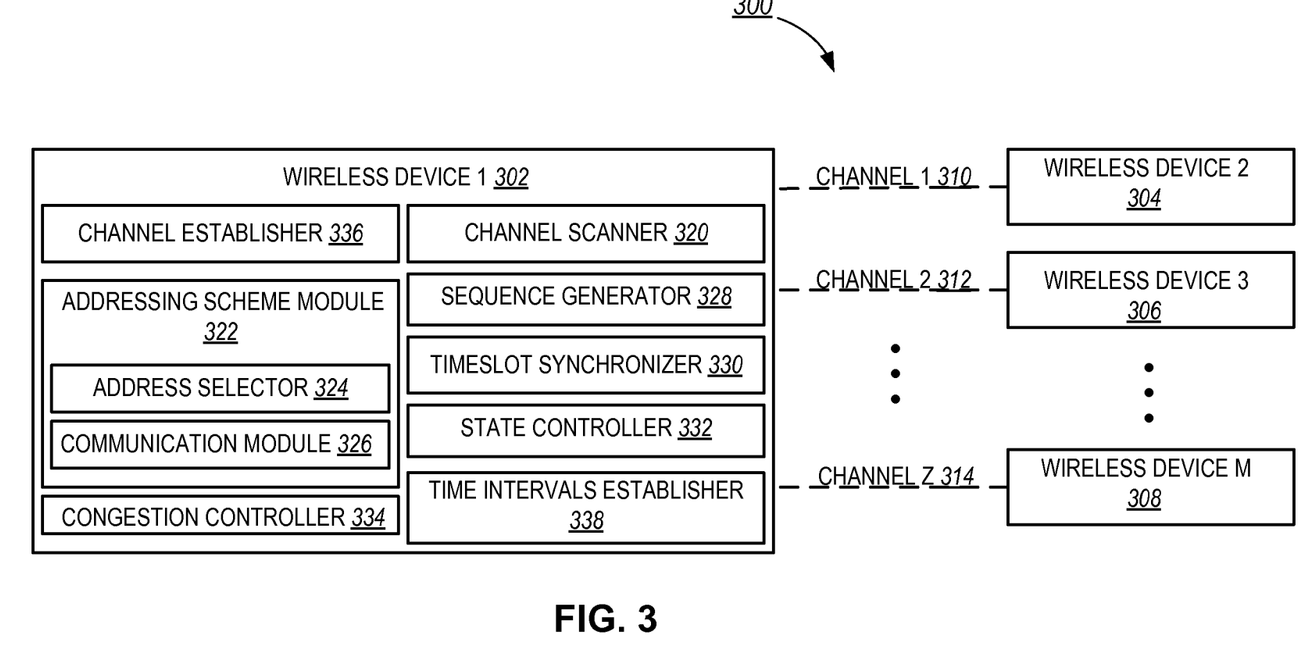
FIG. 3 is a simplified block diagram of exemplary aspects of a communication system including several wireless devices according to one aspect of the invention.
Figure 4:
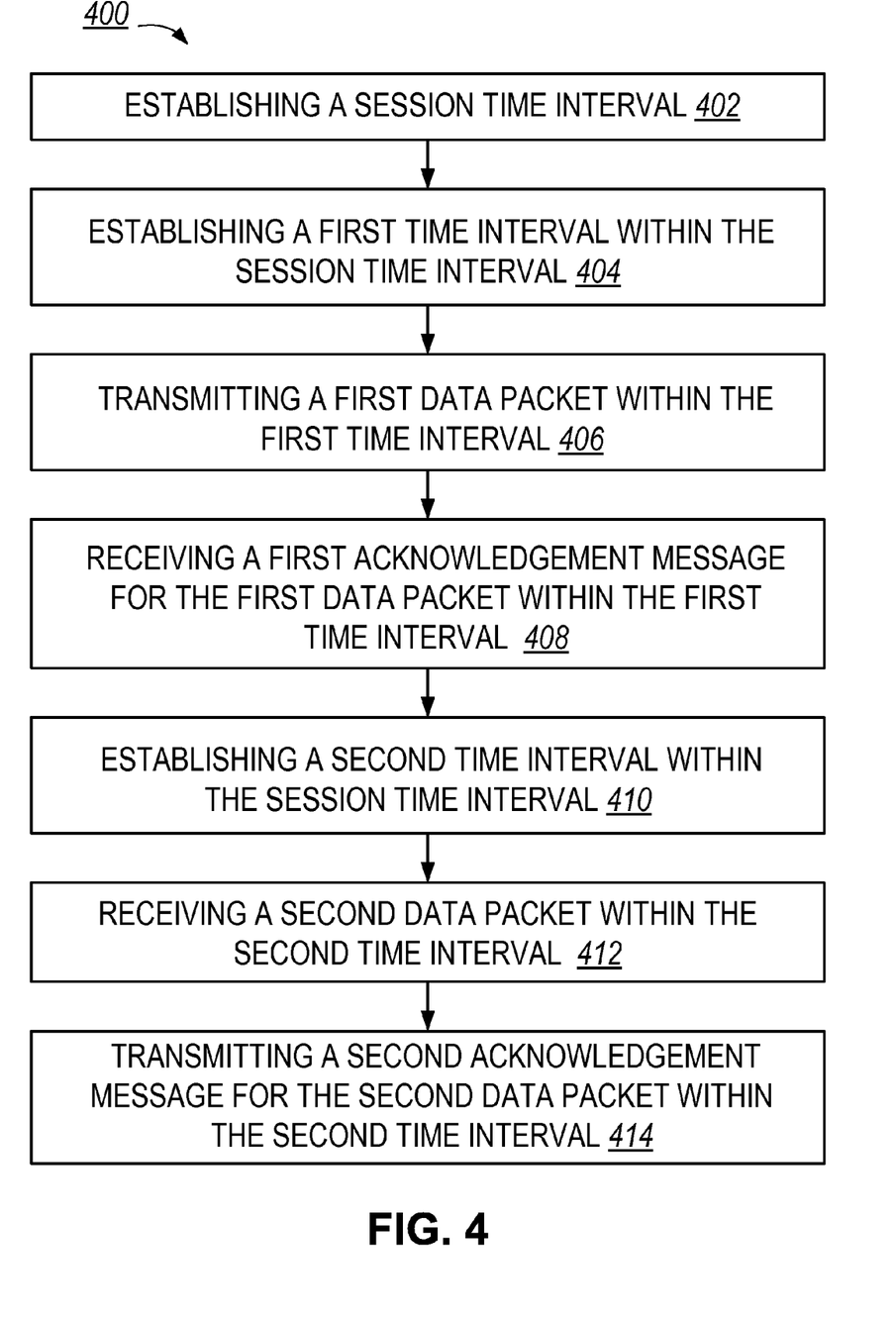
FIG. 4 is a flowchart of exemplary aspects of operations that may be performed to implement synchronous channel timing from a transmitting device's point of view according to one aspect of the invention.

With the above overview in mind, additional details of various operations of a sample media access control scheme will now be discussed in the context of a communication system employing several wireless devices. Specifically, FIG. 3 illustrates a system 300 where several wireless communication devices 1 through M (where M is a positive integer) 302, 304, 306, and 308 are adapted to establish wireless communication channels 1 through Z (where Z is a positive integer) 310, 312, and 314 with one another. The flowchart 400 of FIG. 4 illustrates sample operations that may be used to implement synchronous channel timing. To reduce the complexity of FIG. 3 selected aspects of the devices are only illustrated in conjunction with the device 302. It should be appreciated, however, that the other devices 304, 306, and 308 may incorporate similar functionality.

In FIG. 3, the devices 302, 304, 306, and 308 communicate via a pulse-based physical layer. In some aspects, the physical layer may utilize pulses that have a relatively short length (e.g., on the order of hundreds of nanoseconds, a few nanoseconds, or some other length) and a relatively wide bandwidth.

The device 302 illustrates several components that may be used to define, establish, and communicate over one or more concurrent orthogonal channels. For example, channel establisher component 336 (e.g., implementing functionality of the PDMA controller 112 shown in FIG. 1) may be used to define and/or select different pulse division multiple access ("PDMA") signal parameters for different channels. In a PDMA scheme, the timing of pulses (e.g., the pulse positions in time-space) for the channels may be used to differentiate one channel from another. Here, through the use of relatively narrow pulses (e.g., pulse widths on the order of a few nanoseconds) and relatively low duty cycles (e.g., pulse repetition periods on the order of hundreds of nanoseconds or microseconds), there may be sufficient room to interlace pulses for one or more other channels between the pulses for a given channel.

The device 302 may establish a channel independently or in cooperation with one or more of the other devices 304, 306, and 308 in the system 300 (block 402). In one aspect, a device may be configured to establish a channel with another device by initially communicating with the other device over a known discovery channel. Here, the device seeking to establish the channel may send preliminary messages (e.g., polling messages) over the known channel. In addition, each device in the system may be configured to periodically scan the known channel for any preliminary messages. Once preliminary communications are established between two or more devices over the known channel, the devices may perform an association procedure whereby the devices learn the respective capabilities of each device. For example, during an association procedure each device may be assigned a shortened network address (e.g., shorter than a MAC address), the devices may authenticate one another, the devices may negotiate to use a particular security key or keys, and the devices may determine the level of transactions that may be conducted with each device. Based on these capabilities, the devices may negotiate to establish a new channel for subsequent communication.

In some aspects, the device 302 may include a component 338 to establish time intervals (such as a session time interval, a time interval to transmit a data packet and to receive an acknowledgement message for the transmitted data packet, a time interval to receive a data packet and to transmit an acknowledgement message for the received data packet, and one or more time intervals to retransmit a data packet and to receive an acknowledgement message for the retransmitted data packet). In addition, the device 302 may communicate (e.g., negotiate) with one or more other devices to transmit and receive data (or data packets) as well as messages (such as acknowledgement messages). To this end, the component 302 may include and/or operate in conjunction with a communication component 326 that facilitates such transmission and reception.

FIG. 4 is a flowchart 400 illustrating exemplary aspects of operations that may be performed to provide synchronous channel timing from a transmitting device's point of view in a wireless communications network according to one aspect of the invention. As represented by block 402 in FIG. 4, the device may establish or allot a session time interval. In block 404, the device may establish a first time interval within the established session time interval. As shown in block 406, the device may transmit a data packet within the established or allotted first time interval. In addition, the device may receive, within the established or allotted first time interval, a first acknowledgement message confirming the receipt of the first data packet (block 408). In one aspect, the first acknowledgement message could contain either an acknowledgement (ACK) or a negative acknowledgement (NACK). Furthermore, in an alternative aspect, the acknowledgement message may not be generated in association with the first data packet.

In one aspect, the transmitter device may establish a second time interval within the session time interval, as shown in block 410. In an alternative aspect, the second time interval substantially follows the first time interval. Furthermore, the sum of the first time interval and the second time interval substantially equals the session time interval. Within the established second time interval, the device may receive a second data packet (block 412). In addition, as shown in block 414, the device may transmit a second acknowledgement message to acknowledge receipt of the second data packet. Similar to the first acknowledgement message associated with the first data packet (see block 408 and its description above), the second acknowledgement message could contain either an ACK or a NACK. Furthermore, in one aspect, the second acknowledgement message may not be generated.

Figure 5:
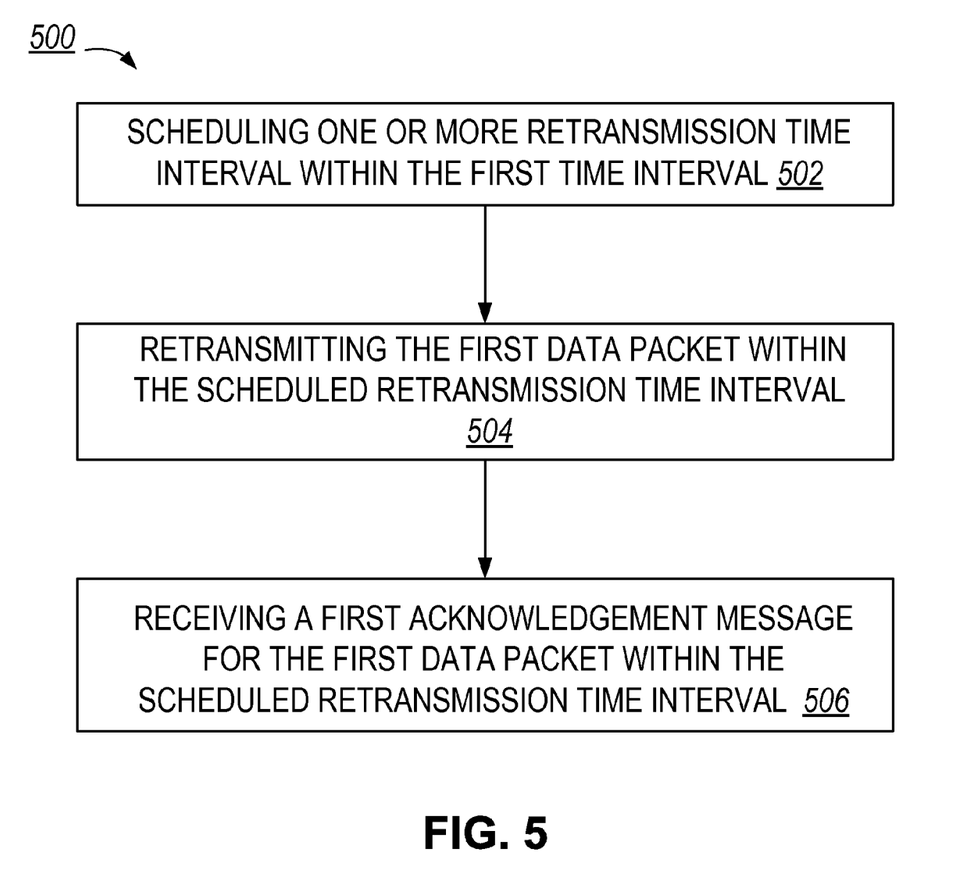
FIG. 5 is a flowchart illustrating exemplary aspects of operations relating to the retransmission of data packets according to one aspect of the invention.

FIG. 5 is a flowchart 500 illustrating exemplary aspects of operations relating to the retransmission of data packets according to one aspect of the invention. As shown in block 502, the device may schedule one or more retransmission time intervals within the established or allotted first time interval. In block 504, the device may transmit the first data packet within the scheduled retransmission time interval. In one aspect, the node retransmits the data packet for a defined number of attempts within scheduled retransmission time interval(s). The number of retransmission attempts would be selected based on a specified power consumption level, a specified reliability level, or both levels. As shown in block 506, within the scheduled retransmission time interval, the node may receive a first acknowledgement message confirming the receipt of the retransmitted first data packet. In one aspect, the acknowledgement message associated with the retransmitted first data packet may not be generated.

Figure 6:
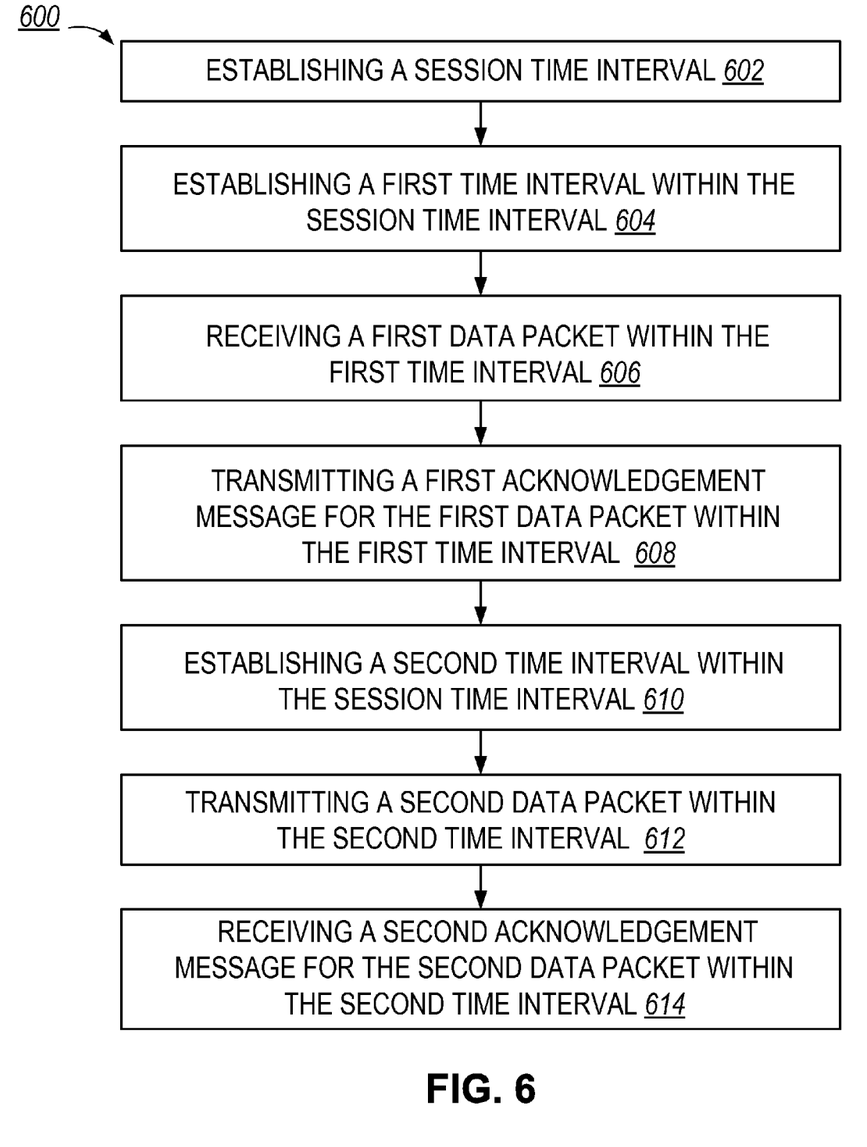
FIG. 6 is a flowchart illustrating exemplary aspects of operations that may be performed to implement synchronous channel timing from a receiving device's point of view according to one aspect of the invention.

FIG. 6 is a flowchart 600 illustrating exemplary aspects of operations that may be performed to implement synchronous channel timing from a receiving device's point of view according to one aspect of the invention. In block 602, the device may establish or allot a session time interval. As represented in block 604, the device may establish a first time interval within the established session time interval. As shown in block 406, the device may receive a data packet within the established or allotted first time interval. In addition, the device may transmit, within the established or allotted first time interval, a first acknowledgement message to acknowledge receipt of the first data packet (block 608). In one aspect, the first acknowledgement message could contain either an acknowledgement (ACK) or a negative acknowledgement (NACK).

In another aspect, the receiving device may establish a second time interval within the session time interval, as shown in block 610. Within the established second time interval, the device may transmit a second data packet (block 612). In addition, as shown in block 614, the device may receive a second acknowledgement message confirming the receipt of the second data packet. In one aspect, the second acknowledgement message could contain either an ACK or a NACK.

Figure 7:
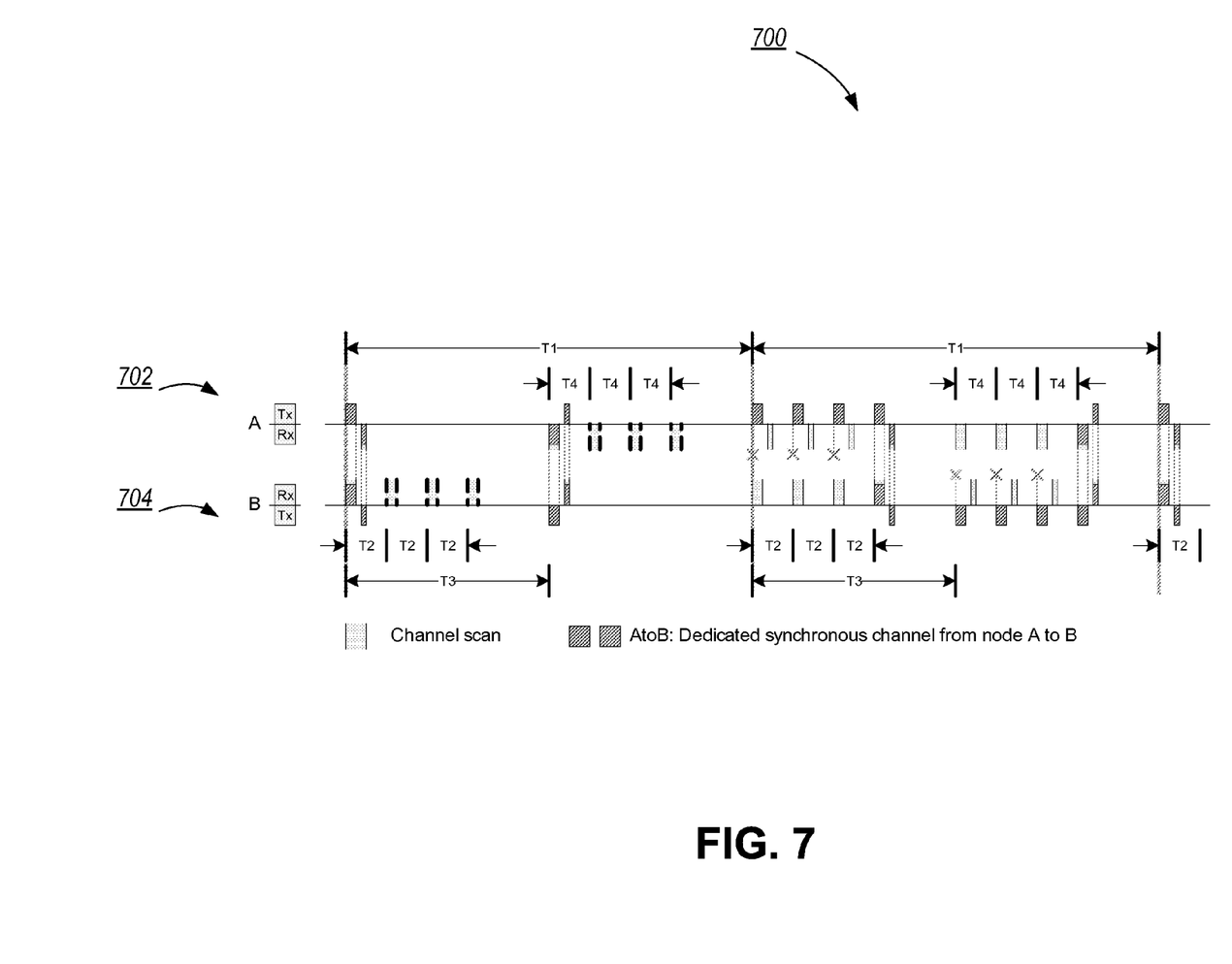
FIG. 7 is a simplified timing diagram showing exemplary aspects of synchronous channel timing.

FIG. 7 is a simplified timing diagram 700 showing exemplary aspects of synchronous channel timing. To simplify the discussion, FIG. 7 illustrates an example of a configuration with two nodes or devices (device A 702 and device B 704). As shown in the figure, the synchronous channel is between a first node (node A) and a second node (node B). The link from node A to device B is called the primary link; and the link from device B to node A is called the secondary link. In one aspect, the synchronous channel timing consists of a number of scans that are scheduled to receive synchronous packet transmissions. The schedule includes transmissions and retransmissions on both the primary link and secondary link. Channel parameters T1, T2, T3 and T4 are used to determine the schedule. In one aspect, no more than one primary link data packet and one secondary link data packet are transmitted during each T1 period. Furthermore, one or more retransmissions can be scheduled to retransmit data packets as needed. If the packet is successfully received and acknowledged during the first transmission, the scheduled retransmissions can be cancelled. As discussed above, in one aspect, the number of scheduled retransmissions would be selected based on a specified power consumption level, a specified reliability level, or both levels.

In addition, state synchronization aligns T1 boundaries between device A 702 and device B 704. Throughout the lifetime of a synchronous channel, device B 704 continuously tracks the synchronous channel timing on device A. In one aspect, when device B acquires or receives a primary-link synchronous packet, it would recalculate the timing to compensate for any clock drifts.

The teachings herein may be incorporated into a variety of devices. For example, one or more aspects taught herein may be incorporated into a phone (e.g., a cellular phone), a personal data assistant ("PDA"), an entertainment device (e.g., a music or video device), a headset, a microphone, a biometric sensor (e.g., a heart rate monitor, a smart band-aid, a pedometer, an EKG device, a keyboard, a mouse, etc.), a user I/O device (e.g., a watch, a remote control, a light switch, etc.) or any other suitable device. Moreover, these devices may have different power and data requirements. Advantageously, the teachings herein may be adapted for use in low power applications (e.g., through the use of a pulse-based signaling scheme and low duty cycle modes) and may support a variety of data rates including relatively high data rates (e.g., through the use of high-bandwidth pulses).

In one aspect, two or more of these devices may independently establish communication with one another to exchange various types of information. For example, a user may carry several of these devices (e.g., a watch, a cell phone, and a headset) wherein data received by one device may be provided to another device for more effective presentation to the user.

Figure 8:
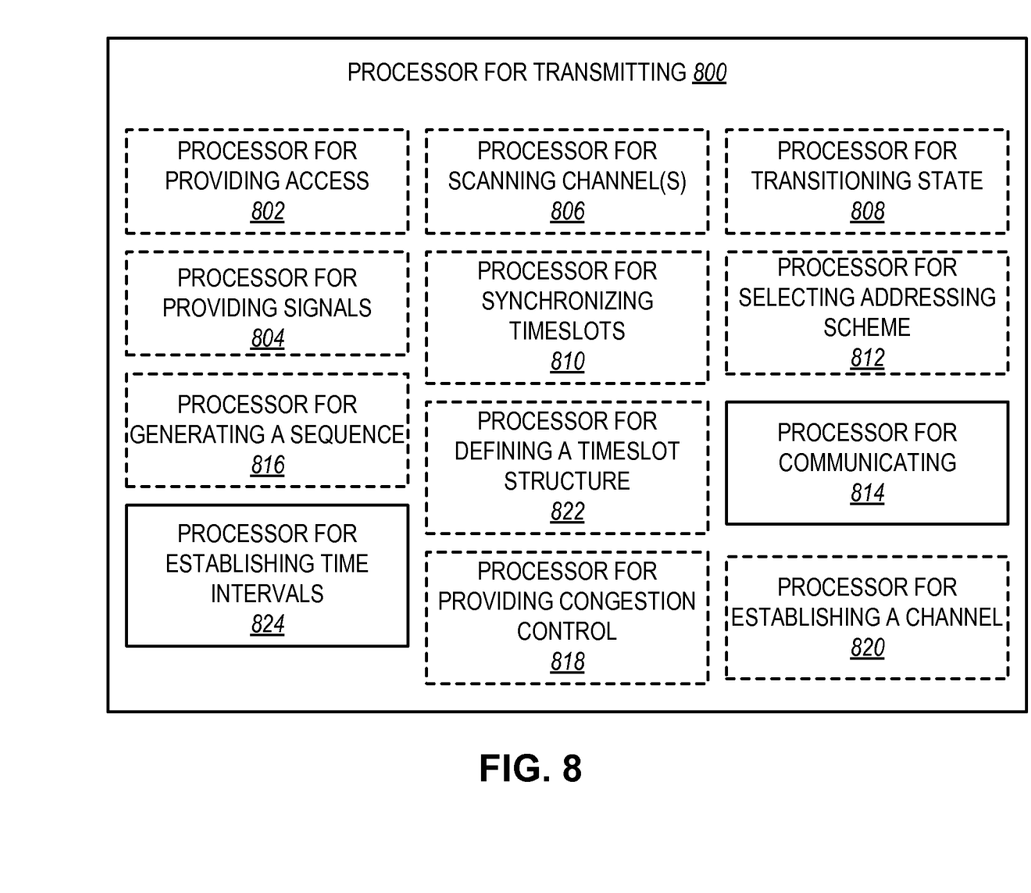
FIG. 8 is a simplified block diagram of exemplary aspects of a transmitting processor adapted to implement synchronous channel timing according to one aspect of the invention.
Figure 9:
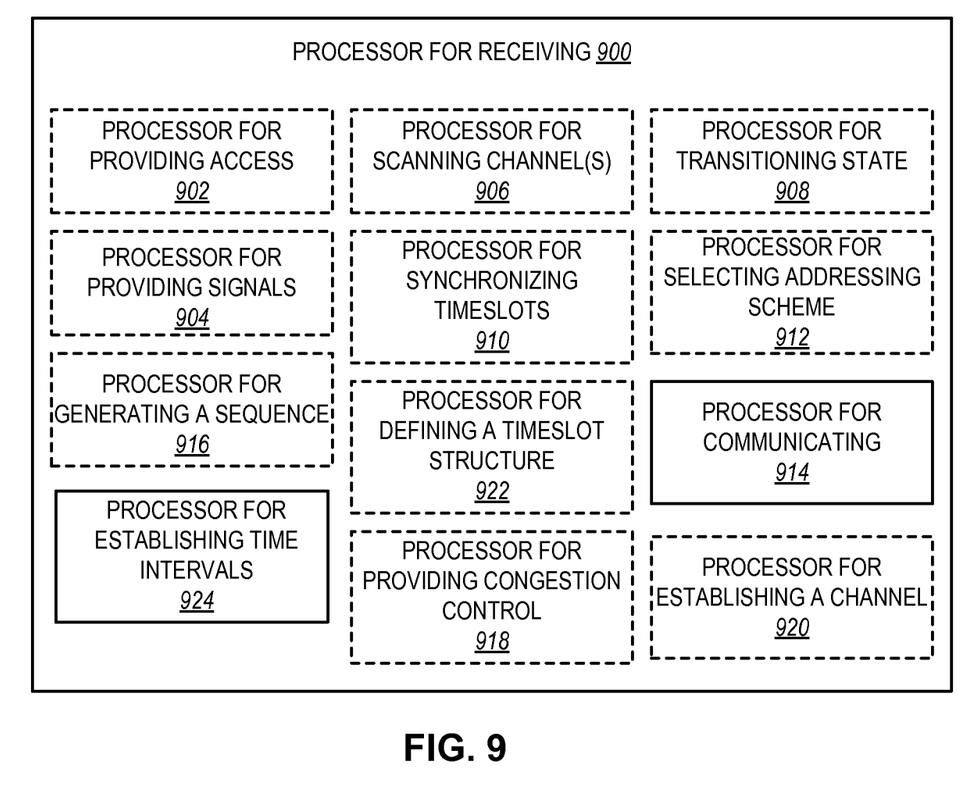
FIG. 9 is a simplified block diagram of exemplary aspects of a receiving processor adapted to implement synchronous channel timing according to one aspect of the invention.

The components described herein may be implemented in a variety of ways. For example, referring to FIG. 8, a transmitting processor 800 includes components 802, 804, 806, 808, 810, 812, 814, 816, 818, 820, 822, and 824 that may correspond to, for example, previously discussed components 108, 116, 320, 114, 330, 324, 326, 328, 334, 336, and 338, respectively. In FIG. 9, a receiving processor 900 includes similar components 902, 904, 906, 908, 910, 912, 914, 916, 918, 920, 922, and 924. FIGS. 8 and 9 illustrate that in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

In addition, the components and functions represented by FIGS. 8 and 9, as well as other components and functions described herein, may be implemented using any suitable means. Such means also may be implemented, at least in part, using corresponding structure as taught herein. For example, in some aspects means for transmitting may comprise a transmitter, means for receiving may comprise a receiver, means for providing access may comprise a media access controller, means for processing signaling may comprise a signal processor, means for establishing a channel may comprise a channel establisher, means for scanning channel(s) may comprise a channel scanner, means for generating a sequence may comprise a sequence generator, means for selecting an addressing scheme may comprise an address selector, means for communicating may comprise a communication module, means for synchronizing timeslots may comprise a timeslot synchronizer, means for transitioning state may comprise a state controller, means for providing congestion control may comprise a congestion controller. One or more of such means also may be implemented in accordance with one or more of the processor components of FIGS. 8 and 9.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitude of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of wireless communication, comprising:
   establishing a session time interval at a wireless device;
   establishing, at the wireless device, a first time interval within the session time interval for transmitting a first data packet, wherein the establishment of the session and first time intervals comprises dynamically defining the intervals at the wireless device;
   transmitting the first data packet at the wireless device within the first time interval;
   receiving at the wireless device, within the first time interval, a first acknowledgement message associated with the first data packet, said first acknowledgment message comprising an acknowledgment (ACK) or a negative acknowledgement (NACK);
   establishing, at the wireless device, a second time interval within the session time interval for receiving a second data packet;
   receiving the second data packet at the wireless device within the second time interval;
   transmitting at the wireless device, within the second time interval, a second acknowledgement message associated with the second data packet, said second acknowledgment message comprising an acknowledgment (ACK) or a negative acknowledgement (NACK);
   establishing a synchronous channel based on the first and second data packets and the first and second acknowledgement messages.

2. The method of claim 1, wherein the first data packet is adapted to indicate a boundary of the session time interval.

3. The method of claim 1, wherein the session time interval and the first time interval are established to set up the synchronous channel with another wireless device.

4. The method of claim 1, wherein the second data packet is adapted to indicate a boundary of the session time interval.

5. The method of claim 1, wherein a sum of the first time interval and the second time interval substantially equals the session time interval.

6. The method of claim 1, wherein the session time interval, the first time interval, and the second time interval are established to set up the synchronous channel with another wireless device.

7. The method of claim 1, wherein the second time interval immediately follows the first time interval.

8. The method of claim 1, further comprising:
   scheduling, at the wireless device, at least one retransmission time interval within the first time interval for retransmitting the first data packet; and
   allowing the retransmission of the first data packet at the wireless device within the at least one scheduled retransmission time interval.

9. The method of claim 8, further comprising:
   allowing the retransmission of the first data packet at the wireless device for a defined number of times selected based on at least one of specified power consumption, such that each retransmission occurs during a different time within the at least one scheduled retransmission time interval.

10. The method of claim 8, further comprising:
    retransmitting the first data packet at the wireless device within the at least one scheduled retransmission time interval; and
    receiving a first acknowledgement message associated with the first data packet at the wireless device within the at least one scheduled retransmission time interval.

11. The method of claim 10, wherein a scheduled retransmission is canceled if the first acknowledgement message is received at the wireless device.

12. A wireless communication apparatus, comprising a processor adapted to:
    establish a session time interval;
    establish a first time interval within the session time interval for transmitting a first data packet, wherein the establishment of the session and first time intervals comprises dynamically defining the intervals;
    transmit the first data packet within the first time interval;
    receive a first acknowledgement message associated with the first data packet within the first time interval, said first acknowledgment message comprising an acknowledgment (ACK) or a negative acknowledgement (NACK);
    establish a second time interval within the session time interval for receiving a second data packet;
    receive the second data packet within a second time interval;

transmit a second acknowledgement message associated with the second data packet within the second time interval, said second acknowledgment message comprising an acknowledgment (ACK) or a negative acknowledgement (NACK);
establish a synchronous channel based on the first and second data packets and the first and second acknowledgement messages.

13. The apparatus of claim 12, wherein the first data packet is adapted to indicate a boundary of the session time interval.

14. The apparatus of claim 12, wherein the session time interval and the first time interval are established to set up the synchronous channel with another wireless communication apparatus.

15. The apparatus of claim 12, wherein the second data packet is adapted to indicate a boundary of the session time interval.

16. The apparatus of claim 12, wherein a sum of the first time interval and the second time interval substantially equals the session time interval.

17. The apparatus of claim 12, wherein the session time interval, the first time interval, and the second time interval are established to set up the synchronous channel with another wireless communication apparatus.

18. The apparatus of claim 12, wherein the second time interval immediately follows the first time interval.

19. The apparatus of claim 12, wherein the processor is further adapted to:
schedule at least one retransmission time interval within the first time interval for retransmitting the first data packet; and
retransmit the first data packet within the at least one scheduled retransmission time interval.

20. The apparatus of claim 19, wherein the processor is further adapted to retransmit the first data packet for a defined number of times selected based on at least one of specified power consumption, such that each retransmission occurs during a different time within the at least one scheduled retransmission time interval.

21. The apparatus of claim 19, wherein the processor is further adapted to receive a first acknowledgement message associated with the first data packet within the at least one scheduled retransmission time interval.

22. The apparatus of claim 21, wherein a scheduled retransmission is canceled if the first acknowledgement message is received.

23. A wireless communication apparatus, comprising:
means for establishing a session time interval and for establishing a first time interval within the session time interval for transmitting a first data packet and a second time interval within the session time interval for receiving a second data packet, wherein the establishment of the session and first time intervals comprises dynamically defining the intervals;
means for transmitting data packets including the first data packet within the first time interval;
means for receiving a first acknowledgement message associated with the first data packet within the first time interval, said first acknowledgment message comprising an acknowledgment (ACK) or a negative acknowledgement (NACK), wherein the means for receiving is configured to receive the second data packet within the second time interval; and
wherein the means for transmitting is configured to transmit a second acknowledgement message associated with the second data packet within the second time interval, said second acknowledgment message comprising an acknowledgment (ACK) or a negative acknowledgement (NACK); and
means for establishing a synchronous channel based on the first and second data packets and the first and second acknowledgement messages.

24. The apparatus of claim 23, wherein the first data packet is adapted to indicate a boundary of the session time interval.

25. The apparatus of claim 23, wherein the session time interval and the first time interval are established to set up the synchronous channel with another wireless communication apparatus.

26. The apparatus of claim 23, wherein the second data packet is adapted to indicate a boundary of the session time interval.

27. The apparatus of claim 23, wherein a sum of the first time interval and the second time interval substantially equals the session time interval.

28. The apparatus of claim 23, wherein the session time interval, the first time interval, and the second time interval are established to set up the synchronous channel with another wireless communication apparatus.

29. The apparatus of claim 23, wherein the second time interval immediately follows the first time interval.

30. The apparatus of claim 23, wherein:
the means for establishing further schedules at least one retransmission time interval within the first time interval for retransmitting the first data packet; and
the means for transmitting further retransmits the first data packet within the at least one scheduled retransmission time interval.

31. The apparatus of claim 30, wherein the means for transmitting further retransmits the first data packet for a defined number of times selected based on at least one of specified power consumption, such that each retransmission occurs during a different time within the at least one scheduled retransmission time interval.

32. The apparatus of claim 30, wherein a first acknowledgement message associated with the first data packet is received within the at least one scheduled retransmission time interval.

33. The apparatus of claim 32, wherein a scheduled retransmission is canceled if the first acknowledgement message is received.

34. A headset, comprising:
a processor adapted to:
establish a session time interval;
establish a first time interval within the session time interval for the headset to transmit a first data packet, wherein the establishment of the session and first time intervals comprises dynamically defining the intervals;
transmit the first data packet within the first time interval;
receive a first acknowledgement message associated with the first data packet within the first time interval, said first acknowledgment message comprising an acknowledgment (ACK) or a negative acknowledgement (NACK);
establish a second time interval within the session time interval for receiving a second data packet;
receive the second data packet within a second time interval;
transmit a second acknowledgement message associated with the second data packet within the second time interval, said second acknowledgment message comprising an acknowledgment (ACK) or a negative acknowledgement (NACK);

establish a synchronous channel based on the first and second data packets and the first and second acknowledgement messages; and a first transducer to generate a signal such that the generated signal is presented as data in the first data packet.

35. The headset of claim 34, wherein:
the headset further comprises a second transducer to process another signal represented by data in the second data packet.

36. A watch, comprising:
a processor adapted to:
establish a session time interval;
establish a first time interval within the session time interval for the watch to transmit a first data packet, wherein the establishment of the session and first time intervals comprises dynamically defining the intervals;
transmit the first data packet within the first time interval;
receive a first acknowledgement message associated with the first data packet within the first time interval, said first acknowledgment message comprising an acknowledgment (ACK) or a negative acknowledgement (NACK);
establish a second time interval within the session time interval for receiving a second data packet;
receive the second data packet within a second time interval;
transmit a second acknowledgement message associated with the second data packet within the second time interval, said second acknowledgment message comprising an acknowledgment (ACK) or a negative acknowledgement (NACK);
establish a synchronous channel based on the first and second data packets and the first and second acknowledgement messages; and
a user interface adapted to process an indication such that the processed indication is represented by data in the first data packet.

37. A sensing device, comprising:
a processor adapted to:
establish a session time interval;
establish a first time interval within the session time interval for the sensing device to transmit a first data packet, wherein the establishment of the session and first time intervals comprises dynamically defining the intervals;
transmit the first data packet within the first time interval;
receive a first acknowledgement message associated with the first data packet within the first time interval, said first acknowledgment message comprising an acknowledgment (ACK) or a negative acknowledgement (NACK);
establish a second time interval within the session time interval for receiving a second data packet;
receive the second data packet within a second time interval;
transmit a second acknowledgement message associated with the second data packet within the second time interval, said second acknowledgment message comprising an acknowledgment (ACK) or a negative acknowledgement (NACK);
establish a synchronous channel based on the first and second data packets and the first and second acknowledgement messages; and
a sensor adapted to generate sensed data represented by data of the first data packet.

38. A computer-program product for wireless communication, comprising:
a non-transitory computer-readable medium encoded with instructions executable to:
establish a session time interval at a wireless device; and
establish, at the wireless device, a first time interval within the session time interval for transmitting a first data packet, wherein the establishment of the session and first time intervals comprises dynamically defining the intervals at the wireless device;
transmit the first data packet at the wireless device within the first time interval;
receive at the wireless device, within the first time interval, a first acknowledgement message associated with the first data packet, said first acknowledgment message comprising an acknowledgment (ACK) or a negative acknowledgement (NACK);
establish, at the wireless device, a second time interval within the session time interval for receiving a second data packet;
receive the second data packet at the wireless device within the second time interval;
transmit at the wireless device, within the second time interval, a second acknowledgement message associated with the second data packet, said second acknowledgment message comprising an acknowledgment (ACK) or a negative acknowledgement (NACK); and
establish a synchronous channel based on the first and second data packets and the first and second acknowledgement messages.

39. A method of wireless communication, comprising:
establishing a session time interval at a wireless device;
establishing, at the wireless device, a first time interval within the session time interval for receiving a first data packet, wherein the establishment of the session and first time intervals comprises dynamically defining the intervals at the wireless device;
receiving the first data packet at the wireless device within the first time interval;
transmitting at the wireless device, within the first time interval, a first acknowledgement message associated with the first data packet, said first acknowledgment message comprising an acknowledgment (ACK) or a negative acknowledgement (NACK);
establishing, at the wireless device, a second time interval within the session time interval for transmitting a second data packet;
transmitting the second data packet at the wireless device within the second time interval;
receiving at the wireless device, within the second time interval, a second acknowledgement message associated with the second data packet, said second acknowledgment message comprising an acknowledgment (ACK) or a negative acknowledgement (NACK);
establishing a synchronous channel based on the first and second data packets and the first and second acknowledgement messages.

40. The method of claim 39, wherein the first data packet is adapted to indicate a boundary of the session time interval.

41. The method of claim 39, wherein the session time interval and the first time interval are established to set up the synchronous channel with another wireless device.

42. The method of claim 39, wherein the second data packet is adapted to indicate a boundary of the session time interval.

43. The method of claim 39, wherein a sum of the first time interval and the second time interval substantially equals the session time interval.

44. The method of claim 39, wherein the session time interval, the first time interval, and the second time interval are established to set up the synchronous channel with another wireless device.

45. The method of claim 39, wherein the second time interval immediately follows the first time interval.

46. A wireless communication apparatus for communicating via a synchronous channel, comprising a processor adapted to:
- establish a session time interval;
- establish a first time interval within the session time interval for receiving a first data packet, wherein the establishment of the session and first time intervals comprises dynamically defining the intervals;
- receive the first data packet within the first time interval;
- transmit, within the first time interval, a first acknowledgement message associated with the first data packet, said first acknowledgment message comprising an acknowledgment (ACK) or a negative acknowledgement (NACK);
- establish a second time interval within the session time interval for transmitting a second data packet;
- transmit the second data packet within the second time interval;
- receive, within the second time interval, a second acknowledgement message associated with the second data packet, said second acknowledgment message comprising an acknowledgment (ACK) or a negative acknowledgement (NACK); and
- establish the synchronous channel based on the first and second data packets and the first and second acknowledgement messages.

47. The apparatus of claim 46, wherein the first data packet is adapted to indicate a boundary of the session time interval.

48. The apparatus of claim 46, wherein the session time interval and the first time interval are established when the synchronous channel is set up.

49. The apparatus of claim 46, wherein the second data packet is adapted to indicate a boundary of the session time interval.

50. The apparatus of claim 46, wherein a sum of the first time interval and the second time interval substantially equals the session time interval.

51. The apparatus of claim 46, wherein the session time interval, the first time interval, and the second time interval are established to set up the synchronous channel with another wireless communication apparatus.

52. The apparatus of claim 46, wherein the second time interval immediately follows the first time interval.

53. A wireless communication apparatus for communicating via a synchronous channel, comprising:
- means for establishing a session time interval and for establishing a first time interval within the session time interval for receiving a first data packet and a second time interval within the session time interval for transmitting a second data packet, wherein the establishment of the session and first time intervals comprises dynamically defining the intervals;
- means for receiving data packets including the first data packet, the means for receiving further receives the first data packet within the first time interval, the means for receiving further receives a second acknowledgement message associated with the second data packet within the second time interval, said second acknowledgment message comprising an acknowledgment (ACK) or a negative acknowledgement (NACK);
- means for transmitting a first acknowledgement message associated with the first data packet within the first time interval, said first acknowledgment message comprising an acknowledgment (ACK) or a negative acknowledgement (NACK), the means for transmitting is configured to transmit the second data packet within the second time interval; and
- means for establishing a synchronous channel based on the first and second data packets and the first and second acknowledgement messages.

54. The apparatus of claim 53, wherein the first data packet is adapted to indicate a boundary of the session time interval.

55. The apparatus of claim 53, wherein the session time interval and the first time interval are established when the synchronous channel is set up.

56. The apparatus of claim 53, wherein the second data packet is adapted to indicate a boundary of the session time interval.

57. The apparatus of claim 53, wherein a sum of the first time interval and the second time interval substantially equals the session time interval.

58. The apparatus of claim 53, wherein the session time interval, the first time interval, and the second time interval are established to set up the synchronous channel with another wireless communication apparatus.

59. The apparatus of claim 53, wherein the second time interval immediately follows the first time interval.

60. A headset, comprising:
a processor adapted to:
- establish a session time interval;
- establish a first time interval within the session time interval for the headset to receive a first data packet, wherein the establishment of the session and first time intervals comprises dynamically defining the intervals;
- receive the first data packet within the first time interval;
- transmit, within the first time interval, a first acknowledgement message associated with the first data packet, said first acknowledgment message comprising an acknowledgment (ACK) or a negative acknowledgement (NACK);
- establish a second time interval within the session time interval for transmitting a second data packet;
- transmit the second data packet within the second time interval;
- receive, within the second time interval, a second acknowledgement message associated with the second data packet, said second acknowledgment message comprising an acknowledgment (ACK) or a negative acknowledgement (NACK);
- establish a synchronous channel based on the first and second data packets and the first and second acknowledgement messages; and
a first transducer to process a signal represented by data in the first data packet.

61. The headset of claim 60, further comprising:
a second transducer to generate signal such that the generated signal is presented as data in the second data packet.

62. A watch, comprising:
a processor adapted to:
- establish a session time interval;
- establish a first time interval within the session time interval for the watch to receive a first data packet, wherein the establishment of the session and first time intervals comprises dynamically defining the intervals;

receive the first data packet within the first time interval;

transmit, within the first time interval, a first acknowledgement message associated with the first data packet, said first acknowledgment message comprising an acknowledgment (ACK) or a negative acknowledgement (NACK);

establish a second time interval within the session time interval for transmitting a second data packet;

transmit the second data packet within the second time interval;

receive, within the second time interval, a second acknowledgement message associated with the second data packet, said second acknowledgment message comprising an acknowledgment (ACK) or a negative acknowledgement (NACK);

establish a synchronous channel based on the first and second data packets and the first and second acknowledgement messages; and a user interface adapted to generate an indication represented by data in the first data packet.

63. A sensing device, comprising:

a processor adapted to:

establish a session time interval;

establish a first time interval within the session time interval for the sensing device to receive a first data packet, wherein the establishment of the session and first time intervals comprises dynamically defining the intervals;

receive the first data packet within the first time interval;

transmit, within the first time interval, a first acknowledgement message associated with the first data packet, said first acknowledgment message comprising an acknowledgment (ACK) or a negative acknowledgement (NACK);

establish a second time interval within the session time interval for transmitting a second data packet;

transmit the second data packet within the second time interval;

receive, within the second time interval, a second acknowledgement message associated with the second data packet, said second acknowledgment message comprising an acknowledgment (ACK) or a negative acknowledgement (NACK);

establish a synchronous channel based on the first and second data packets and the first and second acknowledgement messages; and a sensor adapted to generate sensed data presented as data in the second data packet.

64. A computer-program product for wireless communication, comprising:

a non-transitory computer-readable medium encoded with instructions executable to:

establish a session time interval at a wireless device;

establish, at the wireless device, a first time interval within the session time interval for receiving a first data packet, wherein the establishment of the session and first time intervals comprises dynamically defining the intervals at the wireless device;

receive, at the wireless device, the first data packet within the first time interval;

transmit, at the wireless device and within the first time interval, a first acknowledgement message associated with the first data packet, said first acknowledgment message comprising an acknowledgment (ACK) or a negative acknowledgement (NACK);

establish, at the wireless device, a second time interval within the session time interval for transmitting a second data packet;

transmit, at the wireless device the second data packet within the second time interval;

receive, at the wireless device and within the second time interval, a second acknowledgement message associated with the second data packet, said second acknowledgment message comprising an acknowledgment (ACK) or a negative acknowledgement (NACK); and establish a synchronous channel based on the first and second data packets and the first and second acknowledgement messages.

65. The method of claim 1, wherein the session time interval and the first time interval are defined based on a specified type of data.

66. The method of claim 1, wherein the session time interval and the first time interval are defined based on a specified data rate.

67. The method of claim 1, wherein the session time interval and the first time interval are defined in cooperation with another wireless device.

68. The method of claim 1, wherein the session time interval and the first time interval are defined without coordinating with a central controller.

69. The method of claim 1, further comprising:

scheduling, at the wireless device, at least one retransmission time interval within the first time interval for retransmitting the first data packet; and allowing the retransmission of the first data packet at the wireless device within the at least one scheduled retransmission time interval; and receiving a first acknowledgement message associated with the first data packet at the wireless device within the at least one scheduled retransmission time interval.

70. The method of claim 1, wherein the defining of the session and first time intervals depends on at least one characteristic of data carried by the synchronous channel.

71. The method of claim 70, wherein the at least one characteristic comprises at least one of: a data rate, a type of data, or a quality of service.

72. The method of claim 1, wherein the wireless device negotiates with at least one other wireless device to define the session and first time intervals.

* * * * *